United States Patent [19]

Oyekan

[11] Patent Number: 4,539,307
[45] Date of Patent: Sep. 3, 1985

[54] ACTIVATION OF PLATINUM CONTAINING REFORMING CATALYSTS

[75] Inventor: Soni O. Oyekan, Piscataway, N.J.

[73] Assignee: Engelhard Corporation, Iselin, N.J.

[21] Appl. No.: 588,627

[22] Filed: Mar. 12, 1984

[51] Int. Cl.³ .................. B01J 27/02; C10G 35/06
[52] U.S. Cl. ............................ 502/223; 502/230; 208/138; 208/139
[58] Field of Search ........................ 502/223, 230

[56] References Cited

U.S. PATENT DOCUMENTS

| | | | |
|---|---|---|---|
| 3,689,434 | 9/1972 | Suggett et al. | 502/223 |
| 3,764,557 | 10/1973 | Kluksdohl | 502/223 X |
| 3,767,594 | 10/1973 | Vesely et al. | 502/223 |
| 3,843,560 | 10/1974 | Hayes | 502/223 |
| 3,915,845 | 10/1975 | Antos | 502/223 X |
| 3,933,622 | 6/1976 | Mitchell et al. | 502/223 X |
| 3,968,053 | 7/1976 | Rausch | 502/223 |
| 4,115,253 | 9/1978 | Adams et al. | 502/223 X |
| 4,178,268 | 12/1979 | Antos et al. | 502/223 |
| 4,251,391 | 2/1981 | Mauldin et al. | 502/223 |

Primary Examiner—D. E. Gantz
Assistant Examiner—William G. Wright

[57] ABSTRACT

A metal catalyst preferably comprised of a platinum/rhenium metal combination, supported on alumina is activated for the reforming of hydrocarbon feedstock, by being contacted with an oxygen-containing gas at a temperature sufficient to oxidize the metal catalyst and then being reduced sequentially by contacting the catalyst with a stream of hydrogen at about 650° to about 750° F. for a first period of time and then at about 900° to about 1000° F. for a second period of time, followed by sulfiding of the sequentially reduced catalyst. The sequential reduction procedure increases the selectivity of the reforming catalyst and results in increased $C_5^+$ liquid product yields.

10 Claims, 3 Drawing Figures

FIG. I.

ACTIVATION OF PLATINUM CONTAINING REFORMING CATALYSTS

BACKGROUND OF THE INVENTION

1. Field of the Invention

This invention relates, in general, to the catalytic reforming of a gasoline boiling range petroleum feedstock to improve the octane rating thereof, and more, particularly, to an activation treatment of the reforming catalyst.

2. The Prior Art

Catalytic reforming is a process well known in the petroleum refining industry for improving the octane quality of naphthas and straight run gasolines. In a typical process, a series of reactors are provided with fixed beds of catalyst which receive upflow or downflow feed of naphtha and hydrogen concurrently passed through a reheat reactor, and then, in sequence, through subsequent heaters and reactors of the series. The vapor effluent from the last reactor of the series, a gas rich in hydrogen, is separated from the $C_5+$ liquid product and small amounts of gaseous hydrocarbons and recycled to the process to minimize coke formation; coke invariably forming and depositing on the catalyst during the reaction.

Because of the demand for high octane for use as motor fuel, extensive research is being devoted to the development of improved reforming catalysts. Catalysts for successful reforming processes must possess good selectivity, i.e., be able to produce high yields of high octane number $C_5+$ liquid products and, accordingly, low yields of light gaseous hydrocarbons and carbonaceous by-products. A small increase, e.g. 1-2% increase, in the $C_5+$ liquid product yield can represent a large increase in the productivity of the catalytic process. For example, a 1.25% volume increase in $C_5+$ liquid product yield is equivalent to an additional $600,000 earning gain per year for a 30,000 barrels per stream day (BSAD) catalytic reformer unit. To be commercially acceptable, the reforming catalysts must also possess good activity in order that the temperature required to produce a high $C_5+$ liquid yield not be too high. Apart from good selectivity and activity, it is also necessary that catalysts possess good stability in order that the activity and selectivity characteristics be retained for prolonged use, e.g. 365 days.

Reforming catalysts are recognized as being dual functional. The catalyst is generally a composite including a metal, or metals, providing a hydrogenation- dehydrogenation (hydrogen transfer) function and an acidic component provides an isomerization function. The platinum group metals (ruthenium, osmium, rhodium, iridium, palladium and platinum), particularly platinum, have been widely used in commercial reforming operations, these metals being composited with an inorganic oxide base, particularly alumina. In recent years, promoters such as iridium, rhenium, germanium and tin, have been added, particularly to platinum, to enhance one or more of certain of the characteristics which a good reforming catalyst must possess, namely, activity, selectivity and yield stability. Rhenium has been found particularly useful in providing excellent $C_5+$ liquid product yields and stability. Halogen, e.g. chlorine, is generally added to provide the required acid function.

It is believed that the chief benefit imparted by rhenium to the platinum catalyst is that of greater coke tolerance. The mechanism which makes the catalyst more tolerant of the deactivating coke is not known with any degree of certainty, but it is believed that the formation of intermetallic catalytic alloys, or bimetallic clusters, is the principal factor and that the formation of these species is dependent on the existence thereof of rhenium and platinum in the zero valent state. Note in this regard, a series of articles and Letters to the Editor in the Journal of Catalysis: 35, 434-440 (1974); 39, 485-486 (1975); 43, 18-33 (1976); 46, 438-440 (1977); 52, 444-456 (1978); 56, 468-471 (1979) and 59, 434-445 (1979). In some of these articles, the difficulties associated with reducing rhenium to the zero valent state are discussed and many studies have been conducted with the objective of achieving as complete a reduction of rhenium to the zero valent state as possible. This invention offers an efficient procedure for achieving this objective. It is believed that the principal benefit of the catalyst activation process of the present invention is the attainment of zero valent platinum which in turn catalyzes the reduction of rhenium to the zero valent state.

In the conventional process of activating reforming catalysts, such as platinum composited on alumina with rhenium, the catalyst is first oxidized with a flowing gas stream of an oxygen-containing gas such as air in combination with a halogen containing compound such as chlorine or hydrogen chloride at temperatures ranging from 850° to about 1100° F. and generally at temperatures ranging from 900° to about 980° F. for a period of time ranging from about 1 to about 25 hours and generally about 2 to about 10 hours. Thereafter, the oxidized metallic components of the catalyst are reduced by contact with a flowing stream of hydrogen at a single selected temperature ranging from about 700° to about 950° F. and generally about 850° to about 900° F. for a period of time ranging from about 0.5 to about 40 hours and generally for about 1 to about 10 hours.

During startup of a reforming operation, excessive amounts of light gases, e.g. methane and ethane, are normally produced unless proper pretreatment procedures are utilized. The light hydrocarbon gases, produced as a result of high hydrocracking activity of the catalyst, are particularly to be avoided during reforming since they decrease the yield of gasoline boiling products. Hydrocracking activity can be diminished if the catalyst is sulfided prior to contact with the feedstock. The presulfiding can be accomplished, for example, by passing a sulfur-containing gas, e.g. $H_2S$, through the catalyst bed. Other presulfiding treatments are known in the art.

In spite of the wide success of reforming catalyst, there continues to be a desire in the art, stimulated in part by the withdrawal from gasoline of alkyl lead compounds for ecological reasons, to further improve the octane quality of naphtha and gasolines without the aid of additives. While the above described catalyst systems and catalyst activation procedures are quite effective for reforming, further improvement in the performance of such catalyst is quite desirable.

SUMMARY OF THE INVENTION

In accordance with the present invention, there is provided a process for the activation of a platinum containing reforming catalyst wherein the catalyst is contacted with an oxidizing gas at a temperature of about 900° to about 1050° F. and the oxidized catalyst is then sequentially reduced with a stream of hydrogen at a first temperature of about 650° to about 750° F. followed in sequence by a second higher temperature of about 900° to about 1000° F. The sequentially reduced catalyst is then presulfided at a temperature of about 700° to about 900° F.

As will hereinafter be demonstrated, the platinum reforming catalyst, oxidized, sequentially reduced, and presulfided in accordance with the present invention, is found to exhibit increased selectivity in the reforming of naphtha and gasoline boiling range hydrocarbons. It is found that a $C_5+$ liquid product yield increase of about 1–2 liquid volume percent can be provided by the platinum reforming catalysts activated in accordance with the present invention along with a concurrent lowering of the $C_1$–$C_4$ gaseous yield.

BRIEF DESCRIPTION OF THE DRAWINGS

The present invention may be better understood and will herein after be explained with reference to the graphs in FIGS. 1 to 3, the curves of which show data plotted from simulated life tests indicating the reforming activity and stability of an alumina supported platinum-rhenium reforming catalyst activated in accordance with the process of the present invention, and for comparison purposes, the same catalyst activated in accordance with conventional procedures.

The graph in FIG. 1 shows the average catalyst temperatures as a function of length on test or hours on-stream required to maintain a 98-octane rating for each of the two activated catalysts.

Figure 2:
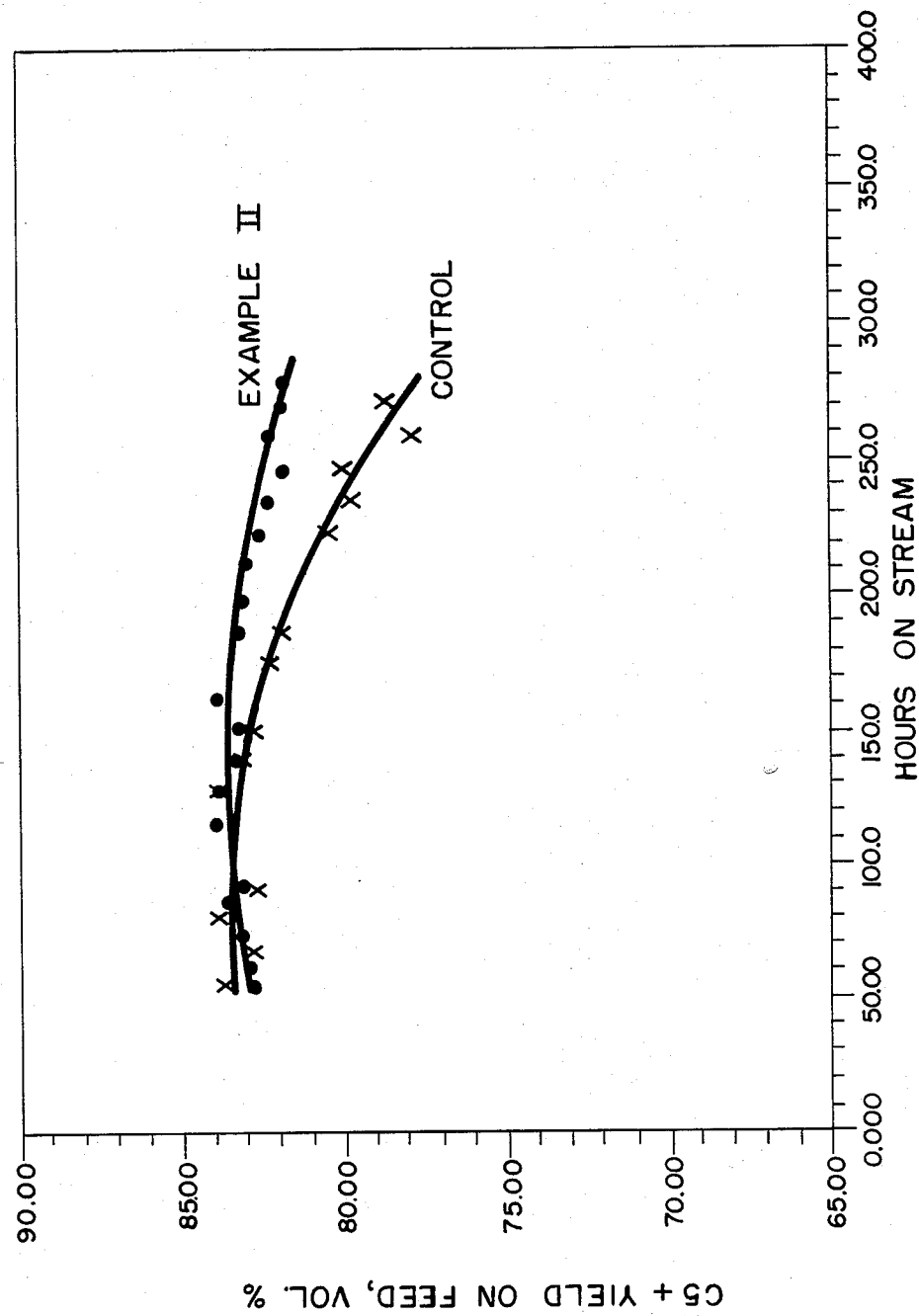

The graph in FIG. 2 shows as a function of the time on-stream, the yield of $C_5+$ liquid product, or gasoline having a 98-octane rating produced during reforming with each of the two catalysts.

Figure 3:
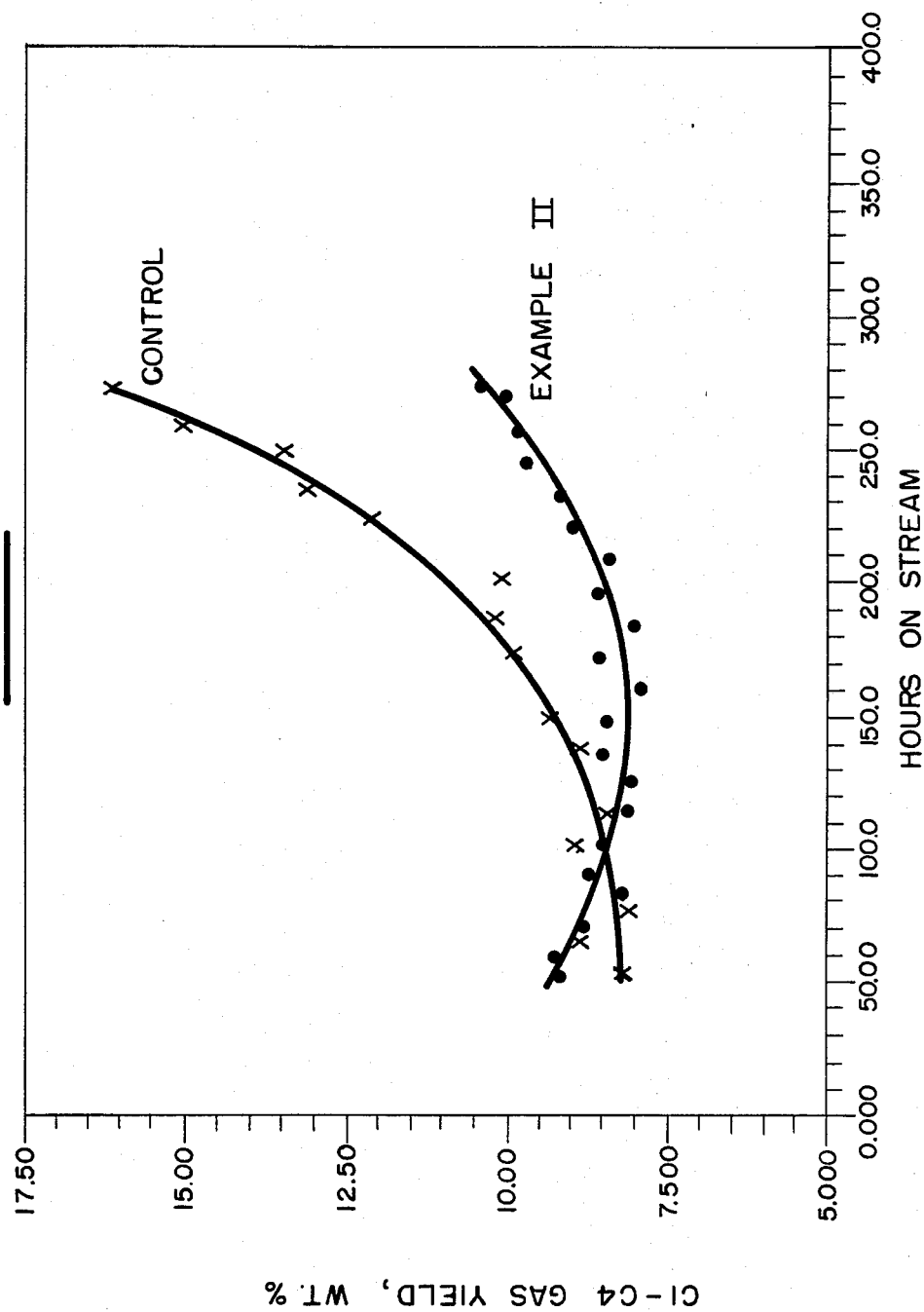

The graph in FIG. 3 shows as a function of the time on-stream, the yield of $C_1$–$C_4$ product in gasoline having a 98-octane rating produced during reforming with each of the two catalysts.

Figure 1:
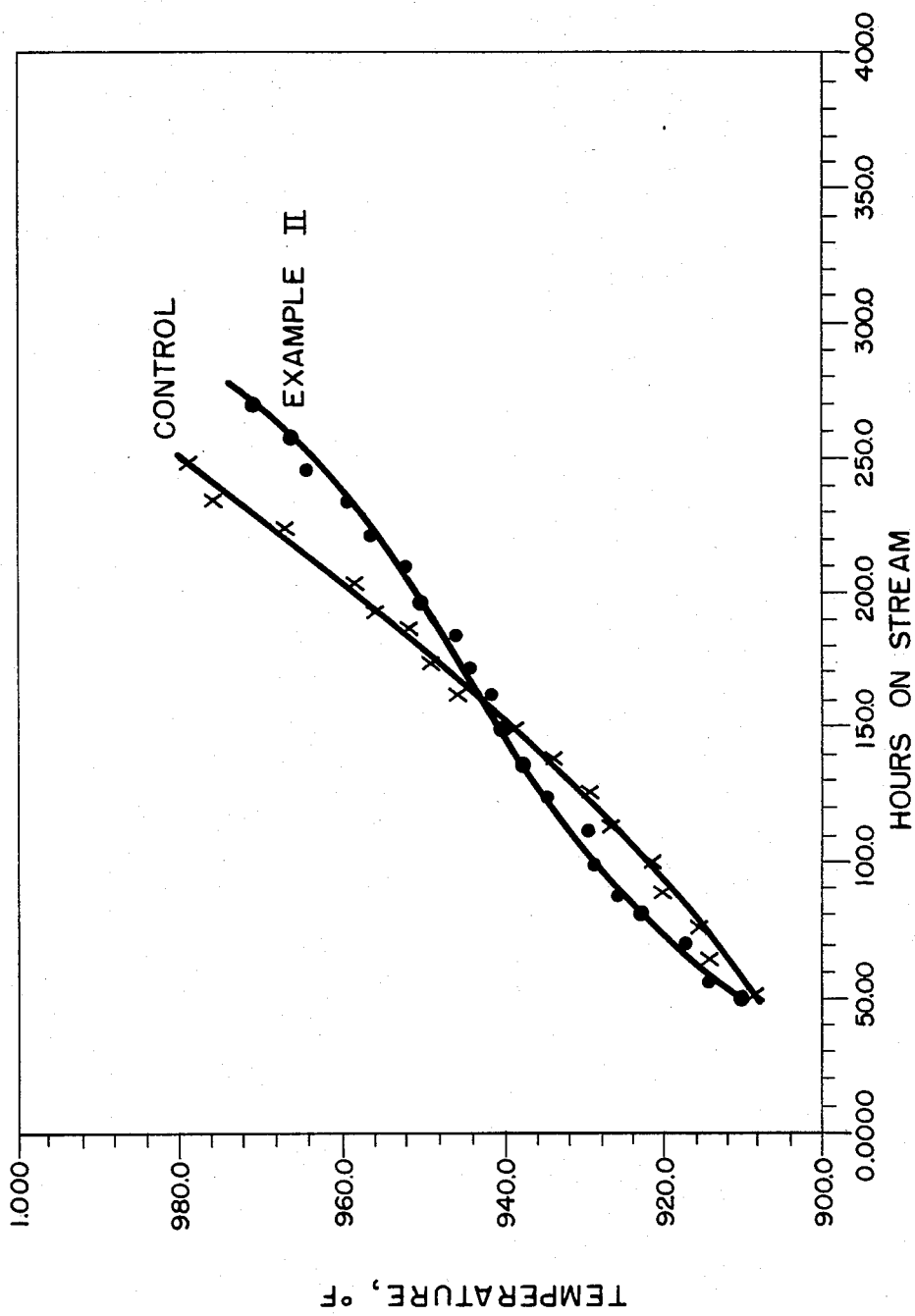

From FIG. 1, it is seen that by activating the platinum-rhenium catalyst in accordance with the present invention, 98-octane gasoline can generally be produced at lower temperatures when compared to the same catalyst activated in accordance with a conventional prior art procedure. From FIGS. 2 and 3, it is seen that activating the platinum-rhenium catalyst in accordance with the present invention yields significantly higher amounts of $C_5+$ liquid product and lesser amounts of $C_1$–$C_4$ gaseous product, when compared to the same catalyst activated in accordance with a conventional prior art procedure.

DETAILED DESCRIPTION OF THE INVENTION

The catalysts, which are activated in accordance with the present invention, are basically a composite of a selected Group VIII metal supported on an active alumina base. The applicable Group VIII metals are at least one of platinum, iridium, osmium, palladium, rhodium and ruthenium. The preferred metal is platinum. This class of catalyst is well known in the art and generally contains from 0.01 to 10 and preferably 0.1 to 1.0 weight percent platinum group metals based on the total catalyst weight including the alumina base.

In the reforming of certain hydrocarbon feedstocks such as naphtha, multimetallic catalysts of platinum and rhenium are preferred for use. A catalyst composition particularly suitable for activation in accordance with the process of the present invention is one which comprises about 0.05 to about 3.0 percent by weight platinum, preferably from about 0.1 to about 1.0 percent by weight platinum, and from about 0.05 to about 3.0 percent by weight rhenium, and preferably about 0.1 to about 1.0 percent by weight rhenium based on the weight of the catalyst composition. The process of the present invention can be used with bimetallic catalysts containing more rhenium than platinum such as those having a ratio of rhenium to platinum of about 2.0 as well as those catalysts wherein the ratio of rhenium to platinum is about 1.0.

The catalysts suitable for use in the process of the present invention also can initially contain minor amounts, e.g. about 0.1 to about 5.0 percent by weight halogen and preferably from about 0.5 to about 2.5 percent by weight halogen incorporated in the composite catalyst during preparation of the catalyst, chlorine being the halogen most commonly used.

The catalyst composite, as a result of the presulfiding treatment also contains sulfur suitably from about 0.001 to about 2.0 percent by weight, preferably about 0.005 to about 0.05 percent by weight sulfur, based on the total weight of the catalyst composition.

The reforming catalysts activated in accordance with the present invention can also contain about 0.1 to about 3.0 percent by weight and preferably about 0.1 to about 1.0 percent by weight of a promoter metal, such as germanium or tin.

As already indicated, in preparing the catalyst used in the present invention, the platinum and rhenium metals as well as the promoter metal and halogen are disposed on a porous solid carrier or support. The porous solid carrier can include a large number of materials including, for example, silicon carbide, charcoal, or carbon. Preferably, the porous solid carrier is an inorganic oxide. A high surface area inorganic oxide carrier is particularly preferred, e.g., an inorganic oxide having a surface area of 50–700 m²/gm. The carrier can be a natural or a synthetically produced inorganic oxide or combination of inorganic oxides. Typical acidic inorganic oxide supports which can be used are the naturally occurring aluminum silicates, particularly when acid treated to increase the activity, and the synthetically-produced cracking supports, such as silica-alumina, silicazirconia, silica-alumina-zirconia, silica-magnesia, silica-alumina-magnesia, and crystalline zeolitic aluminosilicates. Generally, however, reforming processes are preferably conducted in the presence of catalysts having low cracking activity, i.e. catalysts of limited acidity. Hence a preferred carrier is an inorganic oxide such as alumina.

Any of the forms of alumina suitable as a support for reforming catalyst, can be used. Furthermore, alumina can be prepared by a variety of methods satisfactory for the purposes of this invention. The preparation of alumina for use in reforming catalysts is well known in the prior art.

Although the catalytic metals can be intimately associated with the porous solid carrier by suitable techniques such as by ion exchange, coprecipitation, etc., the metals are usually associated with the porous solid carrier by impregnation. Furthermore, one of the metals can be associated with the carrier by one procedure, e.g. ion-exchange, and the other metal associated with the carrier by another procedure, e.g. impregnation. As indicated, however, the metals are preferably associated with the carrier by impregnation. The catalyst can be prepared either by coimpregnation of the two metals or by sequential impregnation. In general, the carrier material is impregnated with an aqueous solution of a decomposable compound of the metal in sufficient concentration to provide the desired quantity of metal in the finished catalyst; the resulting mixture is then heated to remove water. Chloroplatinic acid is generally the preferred source of platinum. Other feasible platinum-containing compounds, e.g. ammonium chloroplatinates and polyaminoplatinum salts, can also be used. Rhenium compounds suitable for incorporation onto the carrier include among others, perrhenic acid and ammonium or potassium perrhenates. Incorporation of the metals on the carrier can be accomplished at any particular stage of the catalyst preparation. For example, if the metals are to be incorporated onto an alumina support, the incorporation may take place while the alumina is in the sol or gel form followed by precipitation of the alumina. Alternatively, a previously prepared alumina carrier can be impregnated with a water solution of the metal compounds. Regardless of the method of preparation of the supported platinum-rhenium catalyst, it is desired that the platinum and rhenium be in initmate association with and dispersed throughout the porous solid catalyst support.

Following incorporation of the carrier material with platinum and rhenium, the resulting composite is usually dried by heating at about 80° to about 400° F. and preferably about 120° to about 300° F. Once dried the catalyst prepared as described above, or regenerated catalyst, is activated by oxidizing the catalyst at about 850° to about 1100° F. and preferably about 900° to about 980° F. in the presence of an oxygen containing gas such as air for about 1 to about 25 hours and preferably about 2 to about 10 hours. In heating the catalyst to temperature, the catalyst is heated incrementally at 100° F. per hour with an air flow at about 2 standard cubic feet (SCF) per hour under atmospheric pressure. When the desired temperature is reached, e.g. 975° F., a superatmospheric pressure is imposed, e.g. 30 to 200 pounds per square inch guage (psig), the air flow is raised to about 6 SCF and the catalyst is heated under these conditions for 10 to 20 hours. Thereafter the air flow is stopped and the sequential reduction step of the activation process of the present invention is performed. To perform the sequential reduction step, the reactor is purged with nitrogen and the temperature lowered to about 650° to about 750° F. to reduce the platinum to the metallic or zero valent state. Preferably, the reduction is performed in the presence of hydrogen, and most preferably in dry hydrogen, i.e. hydrogen that contains less than 1000 ppm moisture. This first reduction heating is continued for 1 to 3 hours using about 2 to about 6 SCF/Hr hydrogen flow.

After the catalyst has been first heated in the reducing atmosphere for the above stated period of time, the temperature of the reactor is raised to about 900° to about 1000° F. and the catalyst is heated at this second temperature for about 3 to about 10 hours and preferably 4 to 8 hours using the same hydrogen containing gas stream flow conditions, i.e. 2 to 6 SCF/Hr. At this temperature, the elemental platinum formed in the first reduction step is believed to catalyze the reduction of the rhenium or other multimetal component of the catalyst to the elemental or zero valent state.

The gas stream employed during the sequential reduction procedure of the present invention is generally composed of about 70 to about 100 volume percent hydrogen, preferably about 95 to 100 volume percent, with any remaining components being up to about 30 volume percent of an inert gas such as nitrogen.

After the second step of the sequential reduction procedure is completed, the reforming catalyst is ready for use, but before such use, the catalysts are advantageously contacted with a gas containing sulfur-providing component in vaporous form. This sulfiding treatment can be conveniently accomplished immediately subsequent to the second of the sequential reduction steps by lowering the temperature of the reactor to about 750° to about 850° F. and contacting the reduced catalyst with a suitable sulfur-providing gaseous material such as $SO_2$ or $H_2S$, preferably the latter. The amount of sulfiding agent employed is at least 25% or even at least 50% of the stoichiometric amount needed to give one atomic weight of sulfur for each atomic weight of total platinum group metal and if present, the second metal such as rhenium in the catalyst composite, preferably the amount ranges up to about 50%.

The sulfiding operation can be done most conveniently after the sequential reduction sequence by admixing about 0.2 to about 1.0 volume percent $H_2S$ with the hydrogen gas being admitted to the pressurized reactor in which the catalyst is sequentially reduced and lowering the temperature of the reactor to about 750° to about 850° F., the temperatures at which the maximum efficacy of the sulfide treatment has been observed. When the sulfiding is conducted subsequent to the sequential reduction procedure, the catalyst is in sulfided form when first contacted with the hydrocarbon stream being reformed thereby avoiding excessive hydrocracking with its attendant yield and selectivity losses.

Hydrocarbon reforming using the catalyst of the present invention is conducted at an elevated temperature of up to about 1000° F. and under a reducing atmosphere provided by the presence of a molecular hydrogen-containing gas. The feedstocks include gasoline boiling range hydrocarbons whether they boil over a broad or narrow temperature range. In such operations, a naphtha, a fraction thereof or other similar boiling range hydrocarbons whose aliphatic and cycloaliphatic constituents are for the most part saturated and which may contain some aromatics, is converted to a product having greater aromaticity and higher octane rating, e.g. from a feedstock having an octane rating in the range of 30 to 60 to a product having an octane rating of 98–100.

The reforming reactions are usually conducted at processing conditions which include reactor inlet temperatures of about 825° to 975° or 1000° F. and total pressures of about 50 to 600 psig, preferably about 100 to 350 psig. During the reforming operation, hydrogen-containing effluent gas is recycled to the reaction system, the recycle gas is usually such to provide about 3 to 30 moles of hydrogen gas per mole of gasoline boiling range hydrocarbon feedstock. Also, the hydrogen charge is often passed to the reactor system at a rate such that the overall space velocity is about 0.5 to 15 WHSV (weight of hydrocarbon per weight of catalyst per hour) preferably about 1 to 6 WHSV. The reaction conditions are such that the normally liquid reformate from the reactor has a RON (Research Octane Number) of at least about 90 and generally in the range of 95 to 100.

Carbonaceous deposits accumulate on the catalysts as reforming proceeds and, as a result, the catalysts lose activity which can be counteracted by increasing the reaction temperature. Eventually, however, when the reactor inlet temperatures reach a desired maximum, for instance in the range of about 950° F. to 1000° F., especially at about 970° F. and above, it becomes inadvisable to increase the temperature further; otherwise undue aging of the catalyst may result. The catalyst can then be regenerated by carbon burn-off which restores the catalytic characteristics sufficiently for the catalysts to be reused on an economic basis.

Carbon burn-off is accomplished by contact of the catalyst with an oxygen-containing gas and generally the amount of oxygen is controlled to maintain the temperature of the catalyst from about 700° to about 1000° F. preferably in the temperature range of about 700° to 850° F. The pressure maintained during burning is preferably elevated for instance, about 50 to 500 psig. The controlled burning is usually initiated with an inert gas, e.g. nitrogen, carbon dioxide or their mixtures, containing a small amount of oxygen, for instance, up to about 1 mole percent and preferably with an oxygen partial pressure of at least about 0.2 psig.

After the carbon burn-off treatment is completed, i.e. after the carbon content of the spent catalyst is less than about 0.5 weight percent and preferably below 0.2 weight percent, the catalyst is subjected to the activation procedure of the present invention, i.e. by contacting the catalyst with an oxygen containing gas at a temperature of 800° to 1000° F. and then sequential reduction in a hydrogen containing gas as previously disclosed.

The following specific Examples are intended to further illustrate the invention and should not be construed as limiting its scope.

EXAMPLE I

A 0.3% Pt/0.3% Re gamma alumina supported catalyst was prepared by impregnating a dry commercial alumina support having a surface area of 220 m²/g, in the form of 1/16 inch pellets, with sufficient hydrochloric acid, chloroplatinic acid and perrhenic acid in aqueous solution to give a catalyst with platinum, rhenium and chloride contents respectively 0.3%, 0.3% and 1% on the support based on the weight of the alumina support. Following the impregnation of the alumina material, the resulting composite was dried by heating at about 200° F. A one hundred gram sample of the dried catalyst was loaded into stainless steel reactor for activation prior to use. The catalyst was then activated by passing air through the reactor at 2 SCF/Hr, the reactor temperature being raised from 80° to 975° F. at the rate of 100° F./Hr. When the temperature of 975° F. was reached, the pressure in the reactor was raised from atmospheric to 60 psig and the air flow rate was raised 6 SCF/Hr and maintained for 1 hour. At the end of the 1 hour period the air oxidation treatment of the catalyst was completed and sequential reduction of the oxidized catalyst was initiated by lowering the temperature of the reactor to 700° F., purging the reactor of air with a nitrogen gas stream. A gas stream containing 100% by volume dry hydrogen was flowed through the reactor at the rate of 6 SCF/Hr. The catalyst was maintained in the reducing atmosphere for 1 hour whereupon the temperature of the reactor was raised to 950° F. and the dry gas stream continued to be flowed through the catalyst bed at the temperature for 6 hours. After 6 hours, the temperature of the catalyst bed was lowered to 800° F. Thereafter the gas stream was switched to a stream containing 0.7% by volume hydrogen sulfide in hydrogen. The catalyst was then sulfided in a recycle mode for 6 hours.

The above prepared catalyst was then employed for the reforming of a hydrocarbon feedstock, consisting mainly of paraffins, naphthenes and aromatics which were passed downflow through the catalyst bed fed at a space velocity (WHSV) of 4 Hr$^{-1}$ at a pressure of 200 psig, a hydrogen/hydrocarbon molar ratio of 3.0 and a temperature sufficient to produce a $C_5^+$ liquid product with a Research Octane Number (RON) of 98 octane. Thus, the temperature in the reaction zone, as measured by the average catalyst bed temperature, was changed with time in order to maintain a liquid product having 98 octane. The hydrocarbon feedstock had the following physical properties and composition:

| Physical Properties | |
|---|---|
| Gravity, °API @ 10° C. | 52.6 |
| ASTM Distillation, °F. | |
| IBP | 218 |
| 10% | 234 |
| 50% | 280 |
| 90% | 350 |
| 95% | 370 |
| FBP | 394 |
| Composition | Vol. % |
| Paraffins | 46.9 |
| Naphthenes | 37.0 |
| Aromatics | 16.1 |
| Sulfur | 0.2 wppm |
| Nitrogen | <1.0 wppm |

At specified times during the reforming reaction, a portion of the reformate stream was withdrawn, weighed and analyzed to determine the conversion of the hydrocarbon feed to $C_5^+$ liquid product as well as gaseous by-products. The amount of $C_5^+$ liquid product and gaseous by-products in the reformate was determined by chromatography and expressed as a weight percentage of the reformate sample at the time the sample was taken. The averaged composition of product samples taken at 6 hour intervals over a 300 hour period are summarized in Table I.

For purposes of comparison, the procedure of Example I was repeated with exception that sequential reduction of the catalyst was not practiced and instead the catalyst was reduced at 950° F. for 10 hours. The averaged composition of samples taken from this comparative run are also summarized in Table I under the heading "Control".

TABLE I

| CYCLE AVERAGED SELECTIVITY DATA | | |
|---|---|---|
| | Example I | Control |
| Hydrogen, wt. % | 2.52 | 2.44 |
| Methane, wt. % | 1.18 | 1.27 |
| Ethane, wt. % | 1.65 | 1.81 |
| Propane + Butane, wt. % | 5.63 | 6.87 |
| $C_5^+$ yield, vol. % | 83.77 | 82.54 |

The data in Table I show that by using the sequential reduction procedure of the present invention, there has been a 1.23% by volume increase in the yield of $C_5^+$ liquid product in the reformate as compared to the Control as well as a concurrent increase in hydrogen and decrease in $C_1$–$C_4$ by-products.

EXAMPLE II

The procedure of Example I was repeated using the same catalyst material. The dried catalyst was activated by passing air through the catalyst at 2 SCF/Hr and heating the reactor to 975° F. at the rate of 100° F./Hour. When the temperature of 975° F. was reached, the pressure in the reactor was raised from atmospheric to 60 psig and the air flow continued at 6 SCF/Hr for 11 hours. At the end of this time period, the air oxidation treatment was completed and sequential reduction of the oxidized catalyst initiated by lowering the temperature of the reactor to 700° F., purging the reactor of air with a dry nitrogen gas before introducing a dry hydrogen gas stream with a moisture content less than 1000 ppm which flowed through the catalyst bed for 1 hour at a flow rate of 6 SCF/Hr. Thereafter the temperature of the reactor was raised to 950° F. and the hydrogen gas stream continued to be flowed throught the catalyst bed at this temperature for an additional 6 hours. Thereafter, the temperature was lowered to 800° F. and the gas stream was switched to a stream of 0.7% by volume hydrogen sulfide in hydrogen. The catalyst was sulfided using a recycle mode for 6 hours. The catalyst was then analyzed and determined to contain, based on the weight of the catalyst, 1.01% chloride, 0.05% sulfur and 0.06% coke.

The above prepared catalyst was then employed for the reforming of a hydrocarbon feedstock having the following composition:

| Physical Properties | |
|---|---|
| API Gravity | 52.6 |
| ASTM Distillation, °F. | |
| IBP | 213 |
| 10% | 238 |
| 50% | 280 |
| 90% | 350 |
| 95% | 320 |
| FBP | 394 |
| Composition | Vol. % |
| Paraffins | 46.9 |
| Naphthenes | 37.0 |
| Aromatics | 16.1 |
| Bromine No. | 0.22 |
| Sulfur | 0.18 wppm |
| Nitrogen | <1.0 wppm |

The feedstock was passed downflow through the catalyst bed feed at a space velocity (WHSV) of 4 $Hr^{-1}$, a pressure of 200 psig, a hydrogen/hydrocarbon molar ratio of 3.0 and a temperature sufficient to produce a $C_5+$ liquid product with a RON of 98. As in Example I, the temperature in the reaction zone was changed with time in order to maintain the production of a product having a 98 octane rating. The change in temperature needed in order to maintain the desired 98 octane product is shown in FIG. 1. The yield of $C_5+$ liquid product having an octane rating of 98 is shown in FIG. 2 and the yield of $C_1-C_4$ gas is shown in FIG. 3. The averaged composition of product samples taken over a 156 hour period in which 98 RON liquid product is maintained are summarized in Table II below.

For purposes of comparison, the procedure of Example II was repeated with the exception that after oxidation of the catalyst in air, the temperature of the reactor was reduced to 900° F., the reactor purged of air and then subjected to a singular reduction step with hydrogen gas at 6 SCF/Hr which was flowed through the reactor for 10 hours at a reactor temperature of 900° F. Thereafter, the catalyst was sulfided at 800° F. Analysis of the catalyst indicated that the activated comparative catalyst contained 0.92% by weight chloride, 0.05% sulfur and 0.08% coke.

The change in temperature needed in order to maintain the desired 98 octane product, the yield of $C_5+$ liquid product and $C_1-C_4$ by-product using catalyst prepared by the comparative single step reduction procedure is also shown in FIGS. 1-3, the curves for the comparative reforming run being designated by the term "Control". The averaged product distribution in reformate product samples taken over a 138 hour period in 98 RON liquid product is maintained is also summarized in Table II below, these results recorded under the heading "Control".

TABLE II
CYCLE AVERAGED SELECTIVITY DATA

| | Example II | Control |
|---|---|---|
| Hydrogen, Wt. % | 2.62 | 2.44 |
| Methane, Wt. % | 1.22 | 1.36 |
| Ethane, Wt. % | 1.53 | 2.12 |
| Propane, Wt. % | 2.74 | 3.13 |
| Butane, Wt. % | 3.34 | 3.43 |
| Total Gas Make, Wt. % | 8.83 | 10.04 |
| $C_3/C_1$, Molar Ratio | 0.82 | 0.86 |
| $C_5+$ Yield, Vol. % | 82.93 | 82.25 |
| Cycle Length, Hours | 156.0 | 138.0 |

TABLE III
Analysis of Used Catalyst

| | Example II | Control |
|---|---|---|
| Chloride, Wt. % | 0.64 | 0.57 |
| Sulfur, Wt. % | 0.03 | 0.02 |
| Coke, Wt. % | 13.10 | 16.1 |
| *EOR Temp, °F. | 968.40 | 1,018 |
| EOR Time, Hrs. | 276 | 270 |

*EOR stands for end of the run and represents the point at which the run was terminated.

By reference to FIG. 1, it is seen that although the temperature increase necessary to maintain a 98 RON reformate was substantially the same for the first 150 hours of the run, for the remaining 125 hours, it was necessary to increase the temperature of the "Control" catalyst catalyzed reforming run to a substantially greater degree when compared to that of the catalyst sequentially reduced in accordance with Example II.

By reference to FIGS. 2 and 3, it is seen that over the 275 hour reforming run, the yield of $C_5+$ liquid product having the desired 98 octane rating decreased significantly in the "Control" catalyzed reforming reaction as compared with the reforming reaction catalyzed with the sequentially reduced catalyst prepared in accordance with Example II, while concurrently the yield of $C_1-C_4$ gas increased significantly in the reforming reaction catalyzed by the "Control" catalyst as compared with the catalyst of Example II thereby indicating the improved sensitivity imparted to the Pt/Re catalyst by the catalyst reduction procedure of Example II.

Reference to Table II confirms the results recorded in FIGS. 2 and 3, namely, that when a sequentially reduced Pt/Re catalyst prepared in accordance with Example II, is employed in reforming of hydrocarbons, the yield $C_5+$ liquid product having the desired octane rating increases with a concurrent decrease in the yield of undesirable light $C_1-C_4$ hydrocarbon gases.

Reference to Table III indicates that there is a lessened coke build-up of the catalyst prepared in accordance with Example II as compared with the "Control."

While specific components of the present system are defined above, many other variables may be introduced which may in any way affect, enhance or otherwise improve the system of the present invention. These are intended to be included herein.

Although variations are shown in the present application, many modifications and ramifications will occur to those skilled in the art upon a reading of the present disclosure. These, too, are intended to be included herein.

I claim:

1. A process for activating a metal catalyst, comprised of platinum and rhenium supported on a porous solid carrier, for reforming a hydrocarbon feedstock by contact of the feedstock with the activated catalyst at reforming conditions, the steps of activation comprising:
    (a) contacting the catalyst with an oxygen-containing gas at a temperature sufficient to oxidize the metal catalyst;
    (b) reducing the oxidized catalyst, sequentially, by first contacting the catalyst with a hydrogen containing gas at about 650° to about 750° F. for a first period of time, raising the temperature to about 900° to about 1000° F. and continuing the reduction in hydrogen for a second period of time; and
    (c) sulfiding the reduced catalyst.

2. The process of claim 1 wherein the oxidation step is conducted by contacting the catalyst with air at about 900° to about 980° F. for about 2 to about 10 hours.

3. The process of claim 1 wherein the first period of contact of the oxidized catalyst with the hydrogen contacting gas is from about 0.5 to about 2.0 hours.

4. The process of claim 1 wherein the second period of contact of the oxidized catalyst with the hydrogen containing gas is from about 5.0 to about 15.0 hours.

5. The process of claim 1 wherein the sulfiding step is conducted by contacting the catalyst with a sulfur-containing gas at a temperature below about 900° F.

6. The process of claim 5 wherein the sulfiding step is conducted at about 750° to about 850° F.

7. The process of claim 1 wherein the catalyst contains from about 0.1 to about 1.0 weight percent platinum and from about 0.1 to about 1.0 weight percent rhenium.

8. The process of claim 1 wherein the porous solid carrier is alumina.

9. The process of claim 1 wherein the catalyst is sulfided to contain from about 0.001 to about 2.0 percent by weight sulfur based on the total weight of the catalyst composition.

10. The process of claim 1 wherein the ratio of rhenium to platinum ranges from about 1.0 to about 2.0.

* * * * *